United States Patent [19]

Pütz

[11] Patent Number: 4,777,002
[45] Date of Patent: Oct. 11, 1988

[54] METHOD OF PRODUCING MOLDS FOR INJECTION MOLDING

[76] Inventor: Alban Pütz, Hellgasse 10, D-5456 Rheinbrohl, Fed. Rep. of Germany

[21] Appl. No.: 913,738

[22] Filed: Sep. 30, 1986

Related U.S. Application Data

[63] Continuation-in-part of Ser. No. 573,566, Jan. 25, 1984, abandoned.

[30] Foreign Application Priority Data

Feb. 7, 1983 [DE] Fed. Rep. of Germany ....... 3304073

[51] Int. Cl.⁴ .................... B29C 33/38; B22C 4/00
[52] U.S. Cl. ........................... 264/226; 164/23; 164/33; 264/225; 264/255; 264/337; 264/338
[58] Field of Search ............ 264/219, 220, 221, 225, 264/226, 2.5, 338, 337, 255; 249/114, 115, 116, 134, 135; 164/23, 33

[56] References Cited

U.S. PATENT DOCUMENTS

| | | | |
|---|---|---|---|
| 3,136,011 | 6/1964 | Peras | 164/23 |
| 3,215,763 | 11/1965 | Buerger | 264/338 |
| 3,405,212 | 10/1968 | Fraser et al. | 264/226 |
| 4,072,673 | 2/1978 | Lammers | 264/225 |
| 4,225,109 | 9/1980 | Yotsutsuji et al. | 249/114 |

Primary Examiner—Jan H. Silbaugh
Assistant Examiner—Mary Lynn Fertig
Attorney, Agent, or Firm—Michael J. Striker

[57] ABSTRACT

Molds for injection molding are produced by providing a primary mold core, coating the primary mold core with a water-resistant coating layer, applying on the water-resistant coating layer a separating layer, spraying a metal shell on the separating layer, arranging a rear filling on the shell so as to form a tool part, and supplying water to the water-soluble layer so as to remove the tool part.

16 Claims, 4 Drawing Sheets

METHOD OF PRODUCING MOLDS FOR INJECTION MOLDING

CROSS REFERENCE TO A RELATED

This application is a continuation-in-part of patent application Ser. No. 573,566, filed Jan. 25, 1984, now abandoned.

BACKGROUND OF THE INVENTION

The present invention relates to a method of production of molds for injection molding, particularly of tools for injection molding of plastics.

Known methods of production of tools for injection molding of plastics include the utilization of high-grade tools which produce molds from fine-steel blocks by material removing operations. The quality and accuracy of the injection molding workpieces depend primarily on the hardness of the workpiece material. The material-removing working is correspondingly tedious and cost-consuming, so that in the event of complicated molds for production of tools high investment is needed which is possible only for high numbers to be produced. When the production of such tools is planned, it is necessary to be sure in advance that the workpiece to be produced has a design which is optimal for the sale and the use. Changes in the tools are almost not possible or can be done in a small range, for example with the aid of electroerosion, which is also a tedious and expensive process. Changes of a greater scale can be accomplished only by production of a new tool.

A tool of a less hard material is less expensive to manufacture; however, it makes possible a lower number of injection and produces workpieces of lower accuracy. In the sense of costs, such less expensive tools are profitable for objects which do not have exact mass and whose number are relatively small, such as for example toys. Such simple tools for correspondingly simple workpieces are cast for example of zinc alloys. They are also formed as hard nickel mold parts galvanoplastically from a primary mold core. The tools cast on zinc basis have the disadvantage that zinc has a tendency to bubble formation. These simple tools can withstand at best 5000–10,000 manufacturing cycles, whereas fine-steel tools of hard-grade alloyed glass-hard steel can carry out 1,000,000 injections.

When before the production of high-grade tools the workpiece is tested in such a manner that, first, they are produced in a testing process with simpler tools, additional costs are involved for testing tools, on the one hand, and there is a risk that the research will be of no value because of the insufficient and unreliable accuracy, on the other hand. The high cost of production of high-grade injection tools in accordance with the existing methods considerably blocks the expansion of the injection molding technique. Each production of a new model involves a high investment risk. In the case when a model is to be introduced into a market, high tooling costs play a negative tool. As soon as the market requires changes, new investments must be made.

These conditions are typical both for the synthetic plastics industry and especially for the tire industry which is in a phase of continuous innovation, since improved profiles for winter tires are searched for as a replacement for spoked tires. During test research the profile is often cut from a smooth protector, since the production of small series in accordance with injection-molding methods is very expensive and for one individual tire four or more segment-shaped tools are needed to be assembled on a common tool. Changes in molds required for special tires, such as tires for street and ground construction, for farming tractors and for cross-country vehicles involve, in relation to the number of pieces, too high costs.

Similar cost difficulties are encountered in the case of injection molding of metal, so here the tools are not so expensive, but they are not durable.

SUMMARY OF THE INVENTION

Accordingly, it is an object of the present invention to provide a method of production of molds for injection molding which avoid the disadvantages of the prior art.

More particularly, it is an object of the present invention to provide a method of production of molds for injection molding which makes possible a faster and very cost-favorable production, on the one hand, and produces the molds which are as high-grade and as hard in their surfaces as the qualitatively best tools produced from fine-grade blocks in material removing operations.

In keeping with these objects and with others which will become apparent hereinafter, one feature of the present invention resides in a method of production of molds for injection molding in accordance with which a primary mold core is provided, a water-resistant coating layer is applied on the primary core, a water-soluble layer is applied on the water-resistant layer, then a fine-steel or a suitable metal or ceramic in melted condition is applied on the water-soluble layer, and after forming the shell with a rear filling of non-yieldable material so that they together form a mold part, water is brought in contact with the water-soluble layer to separate the mold part from the primary mold core.

When the method is performed in accordance with the present invention as defined hereinabove, it eliminates the disadvantages of the prior art.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
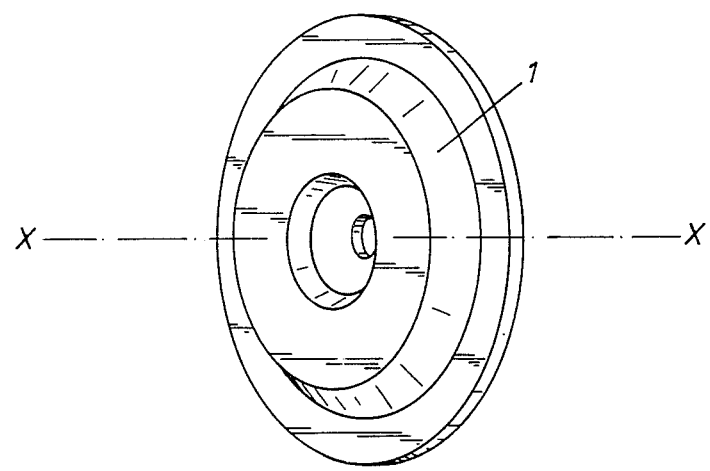
FIG. 1 is a front view of a synthetic plastic shell (prototype) formed by a mold produced in accordance with the present invention.
Figure 2:
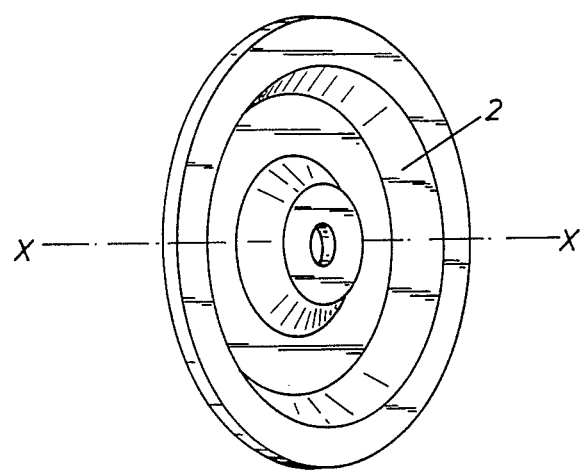
FIG. 2 is a view showing the synthetic plastic shell of FIG. 1 in a rear view.
Figures 3, 4:
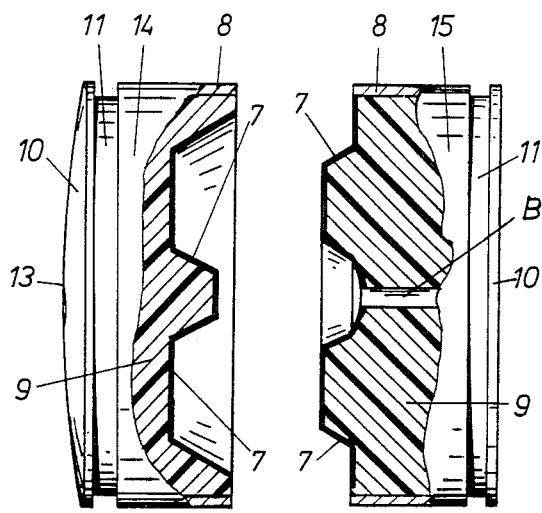
FIG. 3 is a view showing an extruder-spaced part of the mold, partially in section X—X in FIG. 1, which has a fine-steel mold shell with an epoxy resin-quartz sand rear filling in a steel housing with a steel cover.
FIG. 4 is a view showing an extruder-close part of the tool, partially in section X—X in FIG. 2, including a fine-steel mold shell with an epoxy-resin quartz sand rear filling, arranged in a steel housing.
Figure 5:
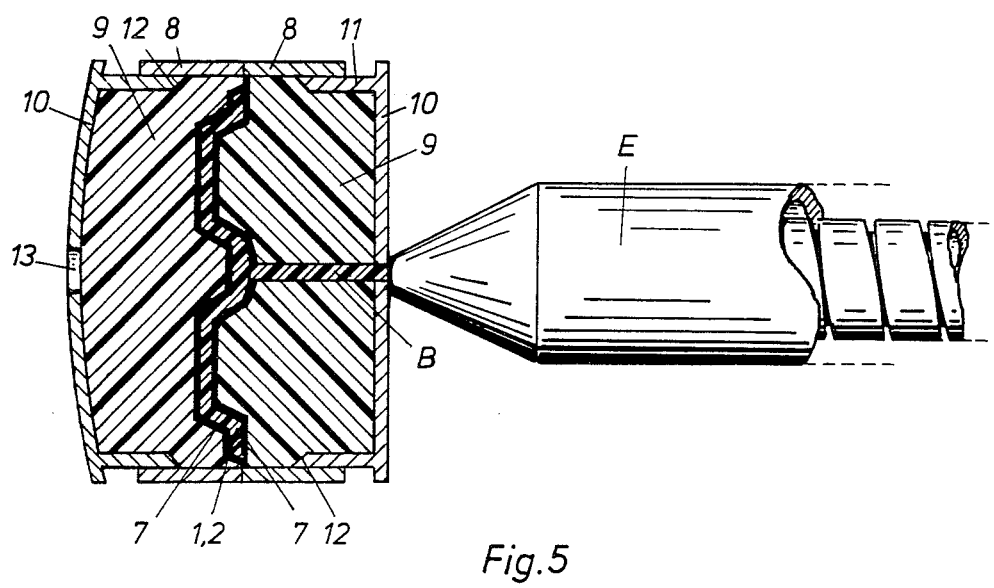
FIG. 5 is a view showing the mold parts of FIGS. 3 and 4 assembled into a common tool on an extruder, in section X—X of FIGS. 3 and 4.

Prototypes of the workpiece to be produced are shown in FIGS. 1 and 2 and identified with reference numerals 1 and 2. A primary mold core is identified with reference numeral 3. A support 4 is provided for the primary mold core 3 and a water-resistant coating layer 5 is arranged on the latter. A water-soluble separating layer 6 follow the water-resistant coating layer 5, and a fine-steel layer 7 is arranged on the water-soluble separating layer 6. A housing 8 surrounds the fine-steel layer 7, and a rear filling is provided on the latter. The housing 8 has a cover 10 with a cover edge 11 with a conical incline 12. An opening 13 is provided in the center of the cover 10.

Reference numeral 14 identified a tool part which is spaced from the exterior, whereas reference numeral 15 identified a tool part which is located close to the exterior. The tool parts have a metallic rear filling 16. Screws 17 are provided for mounting of the edgeless cover 10. Reference numeral 18 identified a copper layer on the fine-steel layer 7.

Figure 6:
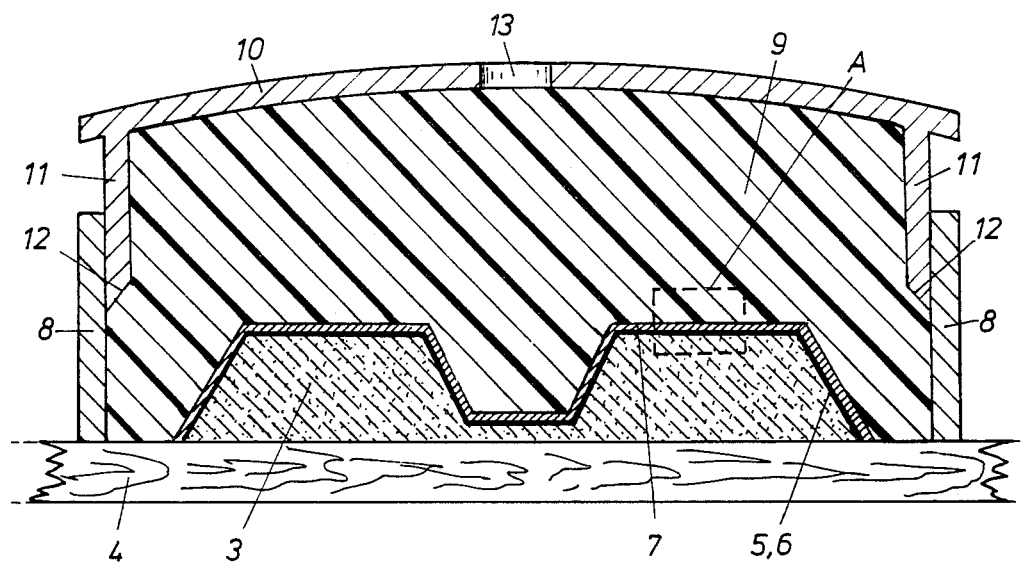
FIG. 6 is a view showing the extruder-spaced mold part of FIG. 3 formed on a primary mold core of gypsum with the shape corresponding to the shape of the surface of the shell of FIG. 1, wherein a steel housing with a cover surrounds this mold part and accommodates a rear filling composed of epoxy resin and quartz sand.
Figure 7:
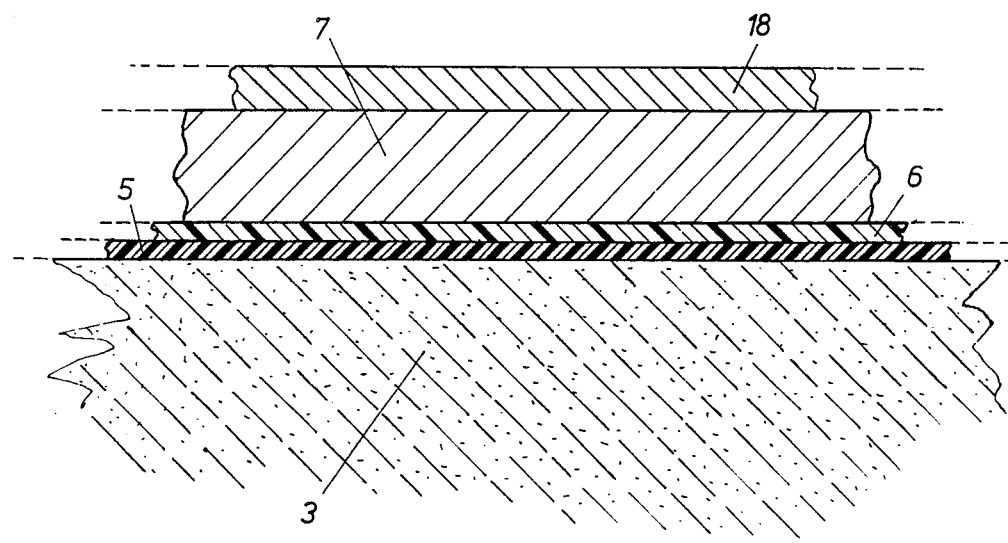
FIG. 7 is a view showing a fragment A of FIG. 6 on a considerably enlarged scale.

In accordance with the inventive method, first of all the primary mold core 3 of gypsum shown in FIG. 6 is produced with the aid of the prototypes 1 and 2 shown in FIGS. 1 and 2. The primary mold core 3 shown in FIG. 6 corresponds in its surface design to the prototype 1. The not shown primary mold core corresponding to the prototype 2 of FIG. 2 is cast in an analogous manner from gypsum. The primary mold cores can also be formed of other materials, as long as they can be subjected to temperatures around 100° C. without deformation, such as for example wood, synthetic plastic, and the like.

Each primary mold core 3 is arranged on a geometrically flat support 4. The water-resistant cover layer 5 is applied on each primary mold core 3 with the aid of a conventional paint spray gun to a layer thickness of 15–30 μm. The water-resistant coatng layer can be formed from a solution including the following components:

| latex | 38% by weight |
| water | 25% by weight |
| finely ground quartz | 25% by weight |
| acrylic resin | 8% by weight |
| hydrosol | 3% by weight |
| alkyde lacquer | 1% by weight |

The latex can be VINNAPAS (polyvinylacetate in aqueous solution) by Wacker-Chemie GmbH (German trade mark);

The acrylic resin can be ACRYLSAEURE (acrylic acid) METACRYLSAEURE (methacrylic acid), ACRONAL (polyacrylicester) by BASF AG (all German trade marks);

The hydrosol can be HYDROSOL by Huels AG, containing acrylic acid in aqueous dispersion;

The alkyde lacquer can be ALCYDHARZLACK (alkyd lacquer) by Bayer AG, or ALKYDAL (polyisobutylene) by BASF AG (all German trade marks), or composition of linseed oil with polyalcohol.

After drying of the coating layers 5, a water-soluble separating layer 6 is sprayed on the coating layer 5 so as to have substantially the same layer thickness as the layer thickness of the layer 5. In many cases it is sufficient to have a total layer thickness of 30 μm for both layers. The watersoluble layer 6 can be produced from a solution including the following components:

| water | 38% by weight |
| finely ground quartz | 36% by weight |
| sugar dissolved in water | 15% by weight |
| adhesive | 8% by weight |
| metal powder | 3% by weight |

Sugar dissolved in water can contain water 50% by weight and sugar 50% by weight.

In the composition the adhesive can be a wallpaper glue, which for example has a tradename METHYLAN by Henkel GmbH, Duesseldorf. Its essential ingredient is methylcellulose as water-soluble cellulose ether.

Metal powder can be nickel metal powder.

As to the weight of water in the exemplary composition set forth above, this water is added water and does not include water from other components. The water which is used in the above composition is a softened water, as interpreted in "Encylopedia Britannica," Vol. 19, p. 651.

The above mentioned specific solution used for the water-resistant layer 5 has also the purpose of forming a water-resistant film on the surface of the primary mold core 3, which is also temperature-resistant. The solution used for forming the water-soluble layer 6 on the water-resistant layer 5 produces a water-soluble film which under the action of impacts and heat of the metal spraying jets does not produce any connection with the water-resistant layer 5 and remains chemically and mechanically separate therefrom. In the case of the primary mold core 3 of gypsum, wood, synthetic plastic and the like, with which no temperatures over approximately 100° C. takes place, the same water-resistant layer 5 can be used for spraying of many fine-steel molds.

The above presented compositions of the layers 5 and 6 are given just as optimal examples. Within the basic idea of the invention many suitable compositions can be provided for these layers. It is noted that the binding and releasing primers which are used in the present invention are commercially available, for example from the inventor at Rheinbrohl, FRG.

The drying of the layers 5 and 6 can, if desired, be accelerated by heating. For the purpose of providing an especially smooth surface of the primary mold core, the mold cores can be carefully ground. Precautions must be taken that the separating layer 6 is not removed during this grinding.

Then the fine-steel melted with the metal spray gun is applied onto both primary mold cores 3. During spraying it must be taken care of that no overheating of the fine-steel layer 7 takes place. The spraying distance between the spray gun and primary mold cores must be at least substantially between 30 and 50 cm, and the spraying takes place in several portions, so that after each spraying portion a short pause is provided so as to enable the sprayed fine steel to be cooled.

At temperatures over substantially 130° C. the separating layer 6 is released from the fine-steel layer 7 so that pressure air or pressure gas can penetrate between the primary mold cores and fine steel layer. The fine steel layer leaks from the primary mold core and after this becomes non-usable. The high content of carbohydrates (sugar disolved in water) serves here as a warning signal: at 100° C. the liquid sugar burns with formation of smoke. The operator of the spray gun then recognizes that he must provide a short pause so as to allow cooling of the fine-steel layer.

For providing the fine-steel layer 7 with a thickness of approximately 1 mm, 15–20 individual layers are needed. For the utilization of the fine-steel layers 7 as mold parts of a tool for injection molding of plastics, such thick shells are not needed. It is sufficient to have considerable smaller thicknesses, approximately between 0.1 and 0.5 mm. Then, in connection with the tool, the fine-steel layer 7 has no supporting functions, as will be explained below. Decisive for the utilization of the fine-steel layers 7 as a mold for injection molding is in the first place the hardness of the material. In contrast to other deformation principles, the material hardness in the present invention plays no role: the hardest chromium steels can be flame sprayed without difficulties.

In the case of application of the fine steel in an oxygen-free spray cabin in accordance with DE GM No. 8,225,728 (later OS No. 3,233,925), the fine-steel layers or mold shells 7 formed on the primary mold cores 3 are sinter-free and have a similar structure to workpieces produced by casting or materialremoving cutting. Then it can be polished respectively. In the case of spraying of fine steel, particularly of Cr-V-steel or Mo-Al-steel in a spraying cabin filled with nitrogen, an additional nitro hardening automatically takes place.

Figure 8:
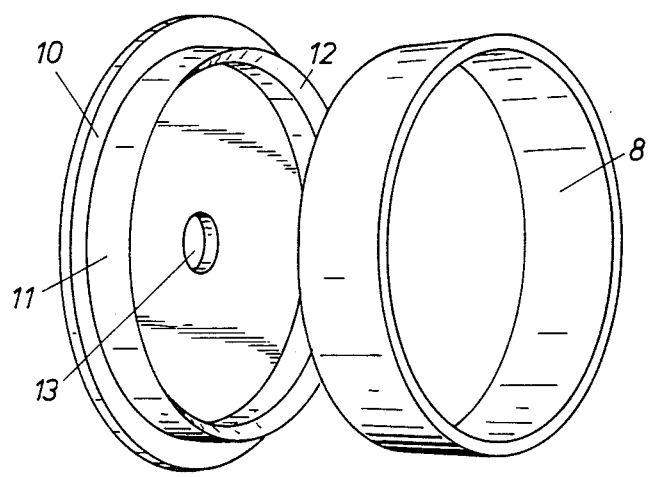
FIG. 8 is a view showing the steel housing with cover, both in perspective.

After cooling of the fine-steel mold shells 7 lying on the primary mold cores 3, each mold shell 7 is surrounded by an upwardly open or downwardly open housing 8, and each housing 8 is filled to its edge with a mixture of epoxy resin and quartz sand forming the rear filling 9. The cover 10 is placed on the housing 8 and extends with its cover edge 11 into the housing 8. The cover edge 11 has a conical shell-shaping line 12. The cover 10 is provided in its center with an opening 13. It is pressed on the housing 8 so that the opoxy resin-quartz sand mixture firmly lies all over on the fine-steel mold shell 7. The cover edge 11 is so dimensioned that it can be inserted into the housing 8 only with difficulties, and therefore no safety measures are needed against carelessness, casting or falling out. The housing 8 and the cover 10 are shown in FIG. 8.

The rear filling 9 can be cmposed of a mixture of epoxy resin-iron powder, epoxy resin/glass powder (or small glass balls). It must be non-elastic and non-yieldable and capable of taking high forces (spray force, on the one hand; and holding force, on the other hand) without yielding.

After introducing the rear filling 9, water is supplied between the primar mold core 3 and the fine-steel shell 7. The water-soluble separating layer 6 is dissolved, and the tool 14, 15 can be separated from the primary mold cover.

A feed opening B provided in the tool part 15 connects a spray unit E of an extruder with the tool 14, 15 as a whole. The tool part 14 which is spaced from the extruder is subjected to the action of the closing force which corresponds to the spraying force acting upon the tool part close to the extruder. The tool 14, 15 as a whole is pressed together by the two forces. The forces are very high, depending upon the machine size and the workpiece size; they can amount to between 10 and 5000 Mp. Since these forces act on the cover 10, each eventaul yielding of the rear fillings 9 is abosrbed by the covers in that the cover edges 11 are displaced inwardly into the rear filling 9 depending upon the respective yielding.

Absolute non-yieldability of the rear fillings is obtained when each rear filling is composed of a low-melting metal which is cast in molten condition in the housing 8. Before this it must be provided that the fine-steel shell 7 is brought to a temperature which is close to the melting point of the metal for the rear filling, since the fine-steel shell otherwise can be warped. The primary mold core 3 must be produced of respective heat-resistant material, for example of copper, with a melting point of 1080° C., whereas the rear filling can be produced of zinc with a melting point of 420° C. or bronze with a melting point of 700° C.

Figure 9:
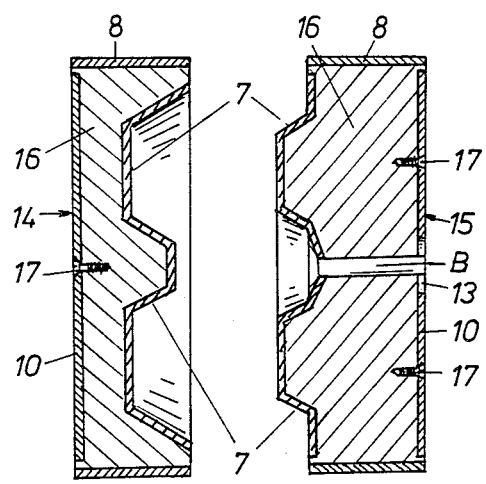
FIG. 9 is a view showing both mold parts with rear filling of metal casting and with respectively simplified housing cover.

During heating of the primary mold core 3 and the fine-steel shell 7, the separating layer 6 and the coating layer 5 are burnt, so that the separation of the workpiece part 14, 15 during filling of the metallic rear filling 16 takes place. Since the metallic rear filling 15 is completely non-yieldable, the cover 10 can act on the closing forces without abutting of the edge and collar on the rear filling, and can be held by screws 17 and the like, as can be seen in FIG. 9.

The metallic rear filling is formed by metal extrusion molding for further production of automobile tires. The extrusion molding is performed with temperatures which are not compatible with a primary mold core of gypsum, synthetic plastic. etc. For the production of tools for the tire fabrication is carried out in segments, and these segment tools are assembled to an annular final tool.

When it is desirable to obtain a fast and uniform heat withdrawal from the fine-steel shell 7, it is advantageous after spraying and cooling of the fine-steel shells 7, to spray on it a copper layer 18.

It will be understood that each of the elements described above, or two or more together, may also find a useful application in other types of constructions differing from the types described above.

While the invention has been illustrated and described as embodied in a method of producing of molds for injection molding, particularly of tools for injection molding of synthetic plastics, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method of producing molds for injection molding, particularly for tools for injection molding of synthetic plastics, the method comprising the steps of providing a primary mold core; spraying on a layer which forms a mold shell; arranging a rear filling so that the mold shell and the rear filling together form a mold part; providing before spraying, between the mold core and the mold shell-forming layer, two separate layers by coating the primary mold core with a heat-resistant and water-resistant coating layer and subsequently applying on the coating layer a heat-resistant and water-soluble separating layer; and supplying water to the water-soluble separating layer so as to release the mold part from the primary mold core.

2. A method as defined in claim 1, wherein said providing step includes providing the primary mold core of a fine steel.

3. A method as defined in claim 1, wherein said providing step includes providing the primary mold core of a metal.

4. A method as defined in claim 1, wherein said providing step includes providing the primary mold core of a ceramic.

5. A method as defined in claim 1, wherein said coating step includes coating of the primary mold core with a water solution of hydrosols, latexes, acrylic resin, finely ground quartz and alkyde lacquer.

6. A method as defined in claim 1, wherein said applying step includes applying a water solution of adhesive, carbohydrate, finely ground quartz and metal powder.

7. A method as defined in claim 1, wherein said applying step includes applying said water-soluble separating layer after drying of said water-insoluble coating layer.

8. A method as defined in claim 1, wherein said coating step includes coating of the primary mold core with a water-resistant coating layer solution having the following composition:

| | |
|---|---|
| latex | 38% by weight |
| water | 25% by weight |
| finely ground quartz | 25% by weight |
| acrylic resin | 8% by weight |
| hydrosol | 3% by weight |
| alkyde lacquer | 1% by weight. |

9. A method as defined in claim 1, wherein said applying step includes applying a water-soluble separating layer solution having the following composition:

| | |
|---|---|
| softened water | 38% by weight |
| finely ground quartz | 36% by weight |
| sugar/dissolved in water | 15% by weight |
| adhesive | 8% by weight |
| metal powder (nickel) | 3% by weight. |

10. A method as defined in claim 1, wherein said arranging step includes arranging the rear filling composed of quartz sand.

11. A method as defined in claim 1, wherein said arranging step includes arranging the rear filling composed of metal powder.

12. A method as defined in claim 1, wherein said arranging step includes arranging the rear filling composed of epoxy resin.

13. A method as defined in claim 1, wherein said arranging step includes arranging the rear filling composed of a cast metal.

14. A method as defined in claim 1; and further comprising the step of pressing a housing surrounding the primary mold core and the mold shell, said arranging step including filling of the rear filling into the housing.

15. A method as defined in claim 14; and further comprising the step of using a cover having a conical shell-shaped edge which engages the housing at all sides and abuts against the rear filling.

16. A method as defined in claim 1, and further comprising the step of applying a copper layer on the mold shell arranged on the primary mold core.

* * * * *